Jones & Mead,
Door Knob.
Nº 59,609.     Patented Nov. 13, 1866.
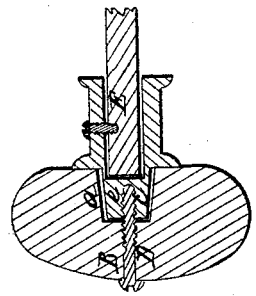
Witnesses:
H. A. C. Smith
Frank Smith
Inventor
George Jones
Beverly E. Mead
by T. S. Lambert Att.

UNITED STATES PATENT OFFICE.

GEORGE JONES AND BEVERLY E. MEAD, OF PEEKSKILL, NEW YORK.

IMPROVEMENT IN FASTENING DOOR-KNOBS TO SHANKS.

Specification forming part of Letters Patent No. 59,609, dated November 13, 1866.

*To all whom it may concern:*

Be it known that we, GEORGE JONES and BEVERLY E. MEAD, of Peekskill, Westchester county, New York State, have invented a new and Improved Method of Fastening Porcelain, Clay, and Mineral Door and other Knobs upon their Shanks; and we do hereby declare that the following is a full and exact description thereof, reference being had to the accompanying drawing, and to the letters of reference marked thereon.

The nature of our invention consists in fastening the porcelain, mineral, or clay knob upon its shank in such a manner that the knob will not turn upon the shank nor become loose from it except when desirable.

To enable others skilled in the requisite arts to make our invention and to use it, we proceed to describe its construction and operation.

We construct a knob having a socket in the under surface of some other than a circular form, (the best is square and tapering, as shown at $a$,) and construct a small hole or canal from the center of the bottom of said socket through the knob to the upper surface of it, as shown at B. We next construct a shank with one end of the same shape as and exactly fitting the said socket $a$, and in the upper end of this shank a hole is drilled or tapped, as shown at $c$, to receive a screw or rivet, D, passing through the knob, against which its bead rests, as shown, and fastened by a thread or by riveting into the shank, as shown at C. E represents a socket in the shank, and is designed to receive a spindle. Through this socket E the inner end of D can be riveted when it is desirable to use a rivet for the purpose of holding the knob fast upon the shank.

By this invention the knob is prevented from turning upon the shank not only, but is permanently fastened, while by the ordinary methods the knob often becomes loose upon the shank, and, indeed, falls off in many instances.

What we claim as our invention, and desire to secure by Letters Patent, is—

The fastening of a porcelain, mineral, or clay door or other knob upon its shank by means of a screw or rivet passing through the knob into the shank, substantially as set forth.

GEO. JONES.
B. E. MEAD.

Witnesses:
THOMAS A. WHITNEY,
ROBERT BROWN.